United States Patent
Kim et al.

(10) Patent No.: US 9,194,019 B2
(45) Date of Patent: Nov. 24, 2015

(54) APPARATUS AND METHOD FOR RECOVERY OF VALUABLE METALS BY ALKALI LEACHING

(75) Inventors: Min-Seuk Kim, Daejeon (KR); Jae-Chun Lee, Daejeon (KR)

(73) Assignee: KOREA INSTITUTE OF GEOSCIENCE AND MINERAL RESOURCES, Daejeon (KR)

( * ) Notice: Subject to any disclaimer, the term of this patent is extended or adjusted under 35 U.S.C. 154(b) by 218 days.

(21) Appl. No.: 13/531,038

(22) Filed: Jun. 22, 2012

(65) Prior Publication Data

US 2012/0325675 A1    Dec. 27, 2012

(30) Foreign Application Priority Data

Jun. 23, 2011 (KR) .................. 10-2011-0061165

(51) Int. Cl.
*C25B 1/46* (2006.01)
*C25B 15/08* (2006.01)
(Continued)

(52) U.S. Cl.
CPC .............. *C22B 3/02* (2013.01); *B01D 19/0005* (2013.01); *C22B 3/0002* (2013.01);
(Continued)

(58) Field of Classification Search
CPC ........ C22B 7/008; C22B 7/009; C22B 11/06; C22B 13/045; C22B 17/04; C22B 21/0023; C22B 21/003; C22B 21/0446; C22B 25/04; C22B 25/0407; C25B 34/34; C25B 61/00
USPC ........... 423/27, 40, 51, 60, 68, 79, 88, 96–98, 423/107–109, 131, 133–135
See application file for complete search history.

(56) References Cited

U.S. PATENT DOCUMENTS 4,320,179 A * 3/1982 Hart ............................... 429/199
5,096,678 A * 3/1992 Mackie ........................... 423/27
(Continued)

FOREIGN PATENT DOCUMENTS

JP    3150803      6/2009
JP    2010007183   1/2010
(Continued)

OTHER PUBLICATIONS

Chinese Office Action dated May 27, 2014, citing the above reference(s).
Chinese Office Action dated Jul. 3, 2014, citing the above reference(s).

*Primary Examiner* — Keith Hendricks
*Assistant Examiner* — Salil Jain
(74) *Attorney, Agent, or Firm* — Hauptman Ham, LLP

(57) ABSTRACT

The present disclosure provides an apparatus and a method for recovery of valuable metals. The apparatus includes an electrolytic chlorine producing bath, a dissolution bath disposed at a rear side of the electrolytic chlorine producing bath to perform leaching of a valuable metal content, a gas supplier connected to the dissolution bath to supply a carrier gas, a collection bath disposed at the rear side of the dissolution bath to collect a volatile material, a separation bath separating and purifying a leaching reactant generated in the dissolution bath, and chlorine and sodium hydroxide recirculation lines connecting the electrolytic chlorine producing bath, the dissolution bath and the separation bath. The apparatus permits recovery of valuable metals according to characteristics of the valuable metal, and the chlorine and sodium hydroxide recirculation lines of the apparatus provides optimized recovery rate and efficiency, thereby realizing economic feasibility.

14 Claims, 2 Drawing Sheets

(51) Int. Cl.
   *C22B 3/02*    (2006.01)
   *C22B 3/12*    (2006.01)
   *C22B 3/14*    (2006.01)
   *C22B 3/20*    (2006.01)
   *B01D 19/00*   (2006.01)
   *C22B 3/04*    (2006.01)
   *C22B 7/00*    (2006.01)
   *C25B 1/34*    (2006.01)
   *C25B 9/08*    (2006.01)
(52) U.S. Cl.
   CPC .............. *C22B 3/0004* (2013.01); *C22B 3/045* (2013.01); *C22B 3/12* (2013.01); *C22B 7/008* (2013.01); *C25B 1/34* (2013.01); *C25B 9/08* (2013.01); *C25B 15/08* (2013.01); *C25B 1/46* (2013.01); *Y02W 30/54* (2015.05)

(56) References Cited

U.S. PATENT DOCUMENTS

| | | | | |
|---|---|---|---|---|
| 5,766,321 | A * | 6/1998 | Ishihara et al. | 96/202 |
| 8,961,911 | B2 * | 2/2015 | Dahal | 423/101 |
| 2009/0315232 | A1 * | 12/2009 | Kim et al. | 266/81 |
| 2010/0018671 | A1 * | 1/2010 | Nara | 165/88 |

FOREIGN PATENT DOCUMENTS

| | | |
|---|---|---|
| KR | 20060034908 A | 4/2006 |
| KR | 10-2006-0104091 | 10/2006 |
| KR | 20090070302 A | 7/2009 |
| KR | 10-2010-0103971 | 9/2010 |
| KR | 10-2010-0103993 | 9/2010 |

* cited by examiner

# US 9,194,019 B2

APPARATUS AND METHOD FOR RECOVERY OF VALUABLE METALS BY ALKALI LEACHING

CROSS-REFERENCE TO RELATED APPLICATION

This application claims the benefit under 35 U.S.C. §119 of Korean Patent Application No. 10-2011-0061165, filed on Jun. 23, 2011 in the Korean Intellectual Property Office, the entirety of which is incorporated herein by reference.

BACKGROUND

1. Technical Field

The present invention relates to an apparatus for recovery of valuable metals including Cu, Zn, Sn, Cr, In, Pb, Mo, V, W, Zr, Ge, Re, Au, Ir, Rh, Ru, Os, or mixtures thereof, and a method for recovery of valuable metals using the same. More particularly, the present invention relates to alkali leaching of valuable metals, an apparatus for recovery of valuable metals, and a method for recovery of valuable metals using the same, which recovers valuable metals by volatizing or dissolving valuable metals using chlorine gas generated in an electrolytic chlorine producing bath in the form of an oxide or leaching solution depending on the kind of valuable metal. Here, the apparatus is a closed system, in which chlorine gas generated in an anode chamber of the electrolytic chlorine producing bath and sodium hydroxide generated in a cathode chamber are re-circulated to allow elimination of additional supply of chlorine and sodium hydroxide from outside, thereby preventing generation of waste liquid and waste gas while ensuring eco-friendliness, safety without leakage of toxic gas, and economical feasibility.

2. Description of the Related Art

Generally, large amounts of valuable metal are contained in scrap and waste produced during manufacture of various electronic products, waste catalysts produced in chemical processes, waste water generated from a plating factory, textile fabrication factory, film development workroom, and the like. Thus, recycling of such waste resources and efficient recovery of valuable metals from the waste resources are very important issues in terms of value creation of the waste resources and prevention of environmental pollution.

Examples of such valuable metals may include copper (Cu), zinc (Zn), tin (Sn), chromium (Cr), indium (In), lead (Pb), molybdenum (Mo), vanadium (V), tungsten (W), zirconium (Zr), germanium (Ge), rhenium (Re), gold (Au), iridium (Ir), rhodium (Rh), ruthenium (Ru), osmium (Os), and the like. As one method for recovery of such valuable metals by processing content or waste water containing such valuable metals and mixtures thereof, alkali leaching is generally performed using an alkaline solution prepared by dissolving an alkaline salt in a solvent.

In general alkali leaching, an aqueous solution containing a large amount of alkaline salt is used for reaction of valuable metals at high temperature. As such, the large amount of alkaline salt is used due to continuous consumption of alkali metal ions, a waste liquid generated during the leaching can cause environmental damage, and the use of such more expensive alkaline salt than acid salts is a main reason for increase in manufacturing cost.

As another method for recovery of valuable metals, electrolysis is used. Electrolysis is used not only for processing valuable metals contained in waste water but also for processing general inorganic or organic compounds. However, electrolysis has problems of a long processing time and low efficiency due to accessory equipment.

BRIEF SUMMARY

The present invention is conceived to solve such problems of the related art and is aimed at providing an apparatus for recovery of valuable metals and a method for recovery of valuable metals using the same, in which chlorine gas is generated in an anode chamber of an electrolytic chlorine producing bath through electrochemical reaction to be used as needed and an aqueous sodium hydroxide solution is prepared in a cathode chamber of the electrolytic chlorine producing bath to be used for leaching. According to the present invention, valuable metals are subjected to leaching in a dissolution bath, followed by volatilization and collection in a collection bath, or followed by separation and purification using a leaching solution in a separation bath according to the kind of valuable metal to be recovered. In addition, according to the present invention, chlorine gas not used in leaching reaction is re-circulated into the electrolytic chlorine producing bath for reduction of the chlorine gas so as to be reused for generation of chlorine gas and the leaching solution used in the dissolution bath is supplied again to the cathode chamber to be used for preparation of sodium hydroxide, thereby eliminating supply of an alkaline source from outside.

The recovery apparatus according to the present invention is constituted by components cooperatively combined with each other to allow significant improvement of a recovery rate of valuable metals. In particular, the recovery apparatus according to the present invention is realized as a closed system such that chlorine and sodium hydroxide can be reused through recirculation in the closed system so as to eliminate supply of chlorine and sodium hydroxide from outside, thereby preventing corrosion of the components and leakage of toxic gas, while ensuring eco-friendliness and maximized process efficiency without generating waste water.

In accordance with an aspect of the present invention, an apparatus for recovery of valuable metals includes: an electrolytic chlorine producing bath; a dissolution bath disposed at a rear side of the electrolytic chlorine producing bath to perform leaching of a valuable metal content; a gas supplier connected to the dissolution bath to supply a carrier gas; a collection bath disposed at the rear side of the dissolution bath to collect a volatile material; a separation bath separating and purifying a leaching reactant generated in the dissolution bath; and chlorine and sodium hydroxide recirculation lines connecting the electrolytic chlorine producing bath, the dissolution bath and the separation bath.

The electrolytic chlorine producing bath may include an electrolyte containing a chloride ion-containing acid or an alkali metal chloride, an anode chamber, a cathode chamber, and an ion exchange membrane dividing the anode chamber and the cathode chamber from each other, and chlorine gas generated in the anode chamber or a sodium hydroxide solution generated in the cathode chamber may be supplied to the dissolution bath.

Each of the anode chamber and the cathode chamber may include a graphite, iridium or titanium electrode, and the ion exchange membrane may be any anion exchange membrane as a separation membrane, which can prevent reaction at one electrode in one of the anode and cathode chambers from affecting reaction at another electrode of the other chamber while allowing selective passage of chloride ions therethrough.

The electrolytic chlorine producing bath generates chlorine gas through electrolysis upon application of electric current or voltage through an electrode connected thereto. As such, chlorine gas is generated and used as needed in real time through electrolysis during leaching operation, thereby eliminating an additional storage tank for supply of chlorine gas, equipment for preventing gas leakage, or equipment for continuous supply of chlorine gas, which has been required for a conventional recovery apparatus, preventing corrosion of equipment, and enabling efficient treatment of environmental mishaps caused by gas leakage.

In the anode chamber of the electrolytic chlorine producing bath, chlorine gas is generated according to the following reaction formula (1).

$$2Cl^- \rightarrow Cl_2\uparrow + 2e^- \quad (1)$$

The chlorine gas obtained by such electrolysis may be stably supplied to the dissolution bath, and the remaining chlorine gas, which is not reacted in the dissolution bath, is resupplied to the cathode chamber of the electrolytic chlorine producing bath through the chlorine recirculation line to be reused. Here, in the cathode chamber, the chlorine gas is converted into a stable chlorine compound through reaction with the sodium hydroxide solution and is then reduced into chloride ions, which in turn move to the anode chamber through the anion exchange membrane to be reused for generation of chlorine gas, thereby optimizing efficiency of chlorine use.

As such, resupply of the remaining chlorine gas from the dissolution bath to the electrolytic chlorine producing bath includes not only resupply of the chlorine gas through the recirculation line connected to the cathode chamber of the electrolytic chlorine producing bath, but also resupply of the chlorine gas from the dissolution bath to the electrolytic chlorine producing bath through the separation bath after leaching operation in the dissolution bath.

According to the present invention, chlorine may be reused through the chlorine recirculation line, thereby eliminating a separate chlorine supply apparatus.

When the electrolyte contains an alkali metal chloride in the electrolytic chlorine producing bath, an alkali metal hydroxide is produced in the cathode chamber. Here, examples of the alkali metal chloride include NaCl, KCl, LiCl, or mixtures thereof, and examples of the alkali metal hydroxide include NaOH, KOH, LiOH, or mixtures thereof. The alkali metal chloride may be sodium chloride (NaCl), and, correspondingly, the alkali metal hydroxide may be sodium hydroxide (NaOH). The sodium hydroxide solution is an alkaline solution for preparation of an oxidative alkaline solution in the dissolution bath and is supplied to the dissolution bath.

In one embodiment, sodium hydroxide is generated in the cathode chamber of the electrolytic chlorine producing bath according to the following reaction formula (2). Further, hydrogen generated therein is used for a power source of a fuel cell or for a heat source.

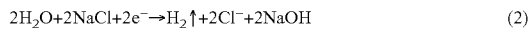

$$2H_2O + 2NaCl + 2e^- \rightarrow H_2\uparrow + 2Cl^- + 2NaOH \quad (2)$$

According to the present invention, the valuable metals may be any valuable metal capable of being dissolved in an alkaline solution. Examples of the valuable metals include copper (Cu), zinc (Zn), tin (Sn), chromium (Cr), indium (In), lead (Pb), molybdenum (Mo), vanadium (V), tungsten (W), zirconium (Zr), germanium (Ge), rhenium (Re), gold (Au), iridium (Ir), rhodium (Rh), ruthenium (Ru), osmium (Os), and the like, without being limited thereto.

According to the present invention, a non-volatile valuable metal may be separated from waste water through leaching reaction using an effective solution in the dissolution bath, and a volatile valuable metal is volatilized and collected after preparing a solution suited to the volatile valuable metal. Further, in the case where the non-volatile valuable metal and the volatile valuable metal are mixed, solutions for the respective metals are prepared, followed by volatilization and collection or followed by separation according to the kind of volatile metal.

When supplied to the dissolution bath, chlorine gas reacts with the oxidative alkaline solution in the dissolution bath to produce at least one specific chlorine compound selected from the group consisting of HClO, ClO$^-$, NaClO, KClO and LiClO, which in turn participates in leaching reaction. Although the pH value of the oxidative alkaline solution produced in this process is lowered due to generation of hydrogen ions according to the reaction formula (3), the alkaline solution produced in the cathode chamber is further added to the dissolution bath, thereby maintaining the pH value of the oxidative alkaline solution.

$$Cl_2 + H_2O \rightarrow HClO + H^+ + Cl^- \quad (3)$$

According to the present invention, the apparatus further includes an oxidative alkaline solution storage bath disposed at a front side of the dissolution bath and connected to the electrolytic chlorine producing bath. When generated in the electrolytic chlorine producing bath, chlorine gas may be supplied to the oxidative alkaline solution storage bath, instead of being supplied to the dissolution bath, and react with an alkaline solution such as NaOH, KOH, or the like to produce an oxidative alkaline solution having a pH value of 8~14, which in turn is stored to be supplied to the dissolution bath, as needed.

In the dissolution bath, the valuable metal content is subjected to leaching reaction with the pH-adjusted oxidative alkaline solution.

When the valuable metal is a volatile metal such as ruthenium or osmium, chlorine gas generated in the electrolytic chlorine producing bath and additionally supplied to the dissolution bath after dissolution lowers the pH value of the leaching solution to a pH value of 10 or less according to the formula (3), and converts ruthenium and osmium dissolved in the leaching solution into gaseous oxides, which in turn are moved to and collected by the collection bath. Here, a carrier gas is supplied from a gas supplier to the dissolution bath to force the gaseous oxides to be smoothly transferred to the collection bath. Examples of the carrier gas include nitrogen, argon, oxygen, and air, without being limited thereto. Although air is advantageous as the carrier gas in terms of economic feasibility, any kind of gas stable in air may be used as the carrier gas.

When the valuable metal is non-volatile, the valuable metal leaches in the form of an cationic species in a oxidative alkaline solution in the dissolution bath and the leaching solution is transferred to the separation bath in which the valuable metal is separated from the leaching solution. In the separation bath, the leaching solution is subject to separation of solid residues through a solid/liquid phase separation membrane, followed by precipitation, solvent extraction, and the like, thereby recovering the valuable metal. Here, the apparatus for recovery of valuable metals according to the present invention resupplies waste liquid to the cathode chamber to be reused through recirculation.

The apparatus for recovery of valuable metals according to the present invention is a closed system in which chlorine gas and sodium hydroxide are re-circulated to be reused, thereby optimizing apparatus efficiency.

Another aspect of the present invention provides a method for recovery of valuable metals using the apparatus for recovery of valuable metal.

The method for recovery of valuable metals includes: a) transferring chlorine gas or a sodium hydroxide solution from an electrolytic chlorine producing bath to a dissolution bath, the chlorine gas or sodium hydroxide solution being produced by applying electric current or voltage to the electrolytic chlorine producing bath; b) subjecting a valuable metal content to leaching with oxidative alkaline solution generated by reaction of the transferred chlorine gas and the sodium hydroxide solution to produce a leaching solution; c) volatizing a leached valuable metals from the leaching solution to be collected in a collection bath or transferring the leaching solution to a separation bath for separation and purification of a valuable metal from the leaching solution; and d) recirculating unused chlorine gas and a chloride ion-containing solution generated during separation of the valuable metal to the electrolytic chlorine producing bath.

The dissolution bath may be provided at a front side thereof with a gas supplier to supply a carrier gas through a nozzle of the dissolution bath.

The electrolytic chlorine producing bath may receive a chlorine-containing acid or an alkali metal chloride and may generate chlorine gas through electrolysis upon application of electric current or voltage thereto through an electrode. Further, a sodium hydroxide solution produced in the cathode chamber may be supplied to the dissolution bath to produce an oxidative alkaline solution.

In operation b), the valuable metal content is subjected to leaching in the oxidative alkaline solution at pH 8 or more and a temperature of 20 to 90° C. In operation b), the oxidative alkaline solution may have a pH value adjusted according to the kind of valuable metal supplied to the apparatus. Specifically, for Mo or W, the oxidative alkaline solution may have a pH of 8 or more, for Ge, Sn, V, Cr, Rh, Ir, Ru, or Os, the oxidative alkaline solution may have a pH of 10 or more, for Zr, Cu, Zn, In, or Pb, the oxidative alkaline solution may have a pH of 13 or more, and for Cd, the oxidative alkaline solution may have a pH of 14 or more.

In operation c), when the content contains a volatile valuable metal, pH of the leaching solution may be adjusted to 1 to 10 to allow the volatile valuable metal to be transferred by a carrier gas to the collection bath and collected thereby. At this time, the dissolution bath may have a temperature ranging from 20 to 90° C. In this operation, pH adjustment may be performed by additional supply of chlorine gas.

In operation c), when the content contains a non-volatile valuable metal, the leaching solution is transferred to the separation bath for separation of the non-volatile valuable metal from the leaching solution. The separation bath includes an extraction unit to allow recovery of the valuable metal through chemical precipitation, ion resin exchange or solvent extraction.

Further, waste liquid generated after recovery of the valuable metal may be transferred to the cathode chamber through a recirculation line such that chloride ions and solution contained in the waste liquid can be reused.

According to the present invention, since the residual solution contains sodium and chloride ions after separation of the leaching solution, the recirculation line is provided to transfer the residual solution to the cathode chamber of the electrolytic chlorine producing bath such that the residual solution can be reused for generation of chlorine gas through electrolysis and for production of an alkaline solution.

In operation c), collection in the collection bath is performed at a temperature of 5~30° C. in a solution containing a reducing agent.

As a source of chloride ions for generation of chlorine gas in the electrolytic chlorine producing bath, a hydrochloride acid solution of pH 1 or less is advantageous, and as the reducing agent used in the collection bath, an alcohol-based organic compound such as methanol, ethanol, isopropanol, and the like may be used to prevent contamination by metallic impurities.

In operation d), recirculation of chlorine gas includes resupply of the chlorine gas remaining in the dissolution bath to the cathode chamber of the electrolytic chlorine producing bath to reduce the chlorine gas into chloride ions in order to reuse the remaining chlorine gas, or resupply of the chloride ion-containing solution, remaining after separation of the valuable metal from the leaching solution in the separation bath, to the cathode chamber of the electrolytic chlorine producing bath to serve as a raw material of the alkaline solution.

According to the present invention, valuable metals are subjected to leaching in the dissolution bath, followed by volatilization and collection in the collection bath, or followed by separation and purification of a leaching solution in the separation bath according to the kind of valuable metal. Further, chlorine gas produced through electrochemical reaction is used, thereby eliminating the need for an additional storage tank for supply of chlorine gas, equipment for preventing gas leakage, or a storage device for continuous supply of chlorine gas. As a result, the present invention is advantageous in terms of cost reduction and process simplification.

In particular, according to the present invention, the electrolytic chlorine producing bath, the dissolution bath and the separation bath are cooperatively connected to each other by the recirculation lines such that the recovery apparatus can be realized as a closed system to allow chlorine gas and sodium hydroxide to be reused through recirculation so as to eliminate supply of chlorine and sodium hydroxide from outside, thereby ensuring excellent eco-friendliness and maximized process efficiency by prevention of equipment corrosion and toxic gas leakage without generating waste water.

BRIEF DESCRIPTION OF THE DRAWINGS

The above and other aspects, features, and advantages of the invention will become apparent from the detailed description of the following embodiments in conjunction with the accompanying drawings, in which.

DETAILED DESCRIPTION

Embodiments of the invention will now be described in detail with reference to the accompanying drawings.

It should be understood that the present invention is not limited to the following embodiments and may be embodied in different ways.

Figure 1:
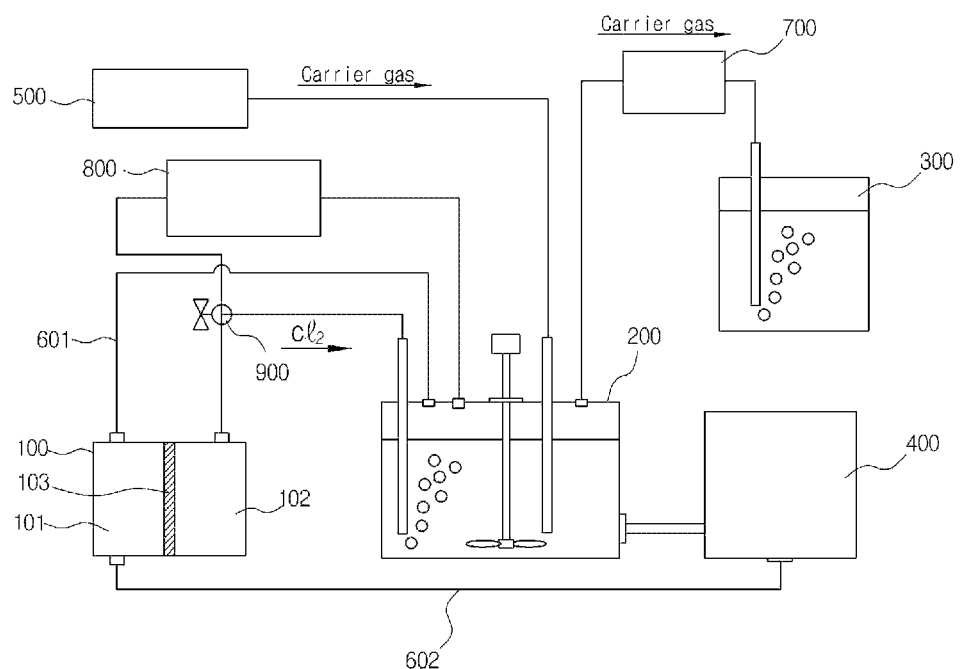
FIG. 1 is a diagram of an apparatus for recovery of valuable metals according to one embodiment of the present invention.
Figure 2:
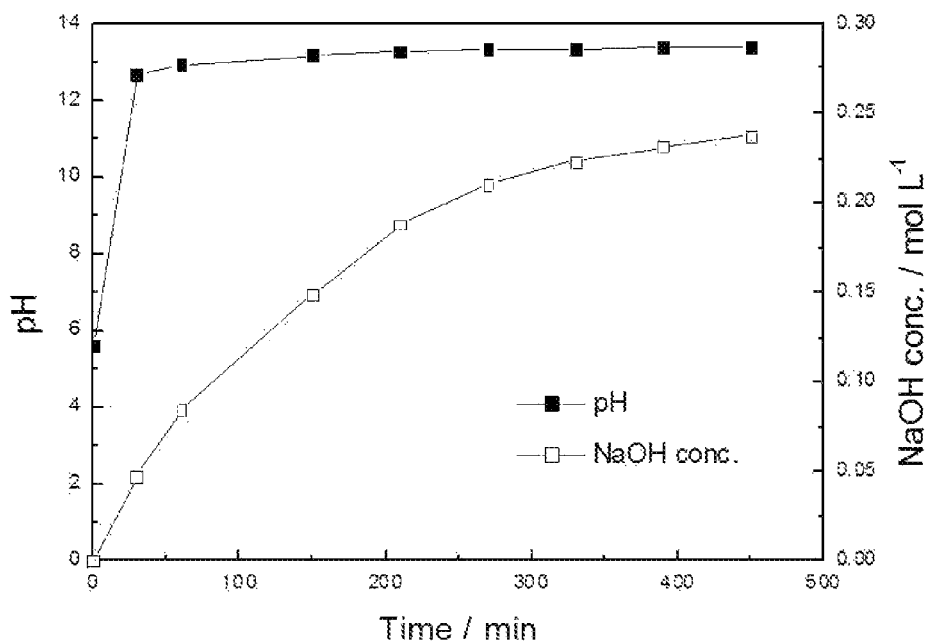
FIG. 2 is a graph depicting pH variation in a cathode chamber according to time, and variation in sodium hydroxide in a solution calculated therefrom.

FIG. 1 is a diagram of an apparatus for recovery of valuable metals according to one embodiment of the present invention. Referring to FIG. 1, the apparatus for recovery of valuable metals includes: an electrolytic chlorine producing bath 100 including a cathode chamber 101, an anode chamber 102, and an ion exchange membrane 103; a dissolution bath 200 disposed at a rear side of the electrolytic chlorine producing bath 100 to leach a valuable metal content; a collection bath 300 disposed at a rear side of the dissolution bath to collect a volatile material; a separation bath 400 disposed at the rear side of the dissolution bath 200 to separate and purify leaching reactants produced in the dissolution bath 200; a gas supplier 500 connected to the dissolution bath to supply a carrier gas; an oxidative alkaline solution storage bath 800; and chlorine and sodium hydroxide recirculation lines 601, 602 connecting the electrolytic chlorine producing bath 100, the dissolution bath 200 and the separation bath 400 to each other.

The dissolution bath 200 receives a valuable metal content as a dissolution target through an input port and serves to supply an alkali metal hydroxide solution and to adjust pH of the alkali metal hydroxide solution. The dissolution bath 200 is provided with a stirrer, which stirs a liquid and the content in the dissolution bath 200, and is further provided with a pH sensor for adjustment and maintenance of pH.

In the electrolytic chlorine producing bath 100, a suitable amount of chlorine gas, according to the kind of valuable metal, is produced by electrolysis and supplied to the dissolution bath 200. The electrolytic chlorine producing bath 100 contains a chloride ion-containing electrolyte and includes the cathode chamber 101 and the anode chamber 102, which are divided by the ion exchange membrane 103. In the electrolytic chlorine producing bath 100, chlorine gas is produced at an anode in the anode chamber 102 upon application of electric current thereto for oxidation and is supplied to the dissolution bath 200 through a chlorine supply line. Here, one end of the chlorine supply line may be immersed into a liquid within the dissolution bath 200 and may be provided with an air diffuser to optimize a conversion rate, at which the chlorine gas is converted into a chlorine compound.

Each of the anode and cathode chambers 102, 101 may include a graphite, iridium or titanium electrode, and the ion exchange membrane 103 may be composed of any anion exchange membrane as a separation membrane, which can prevent reaction at one electrode in one of the anode and cathode chambers from affecting reaction at another electrode of the other chamber while allowing selective passage of chloride ions therethrough.

When an alkali metal chloride is used to supply chloride ions to the electrolyte, an alkali metal hydroxide is produced in the cathode chamber 101 through a corresponding reaction. The alkali metal hydroxide is supplied in the form of a solution to the dissolution bath 200 and is used as a raw material for the oxidative alkaline solution. Preferably, the alkali metal hydroxide is sodium hydroxide.

In the present invention, when supplied to the dissolution bath 200, chlorine gas reacts with the alkaline solution in the dissolution bath 200 to produce at least one chlorine compound, which is selected from the group consisting of $HClO$, $ClO^-$, $NaClO$, $KClO$, and $LiClO$. Here, the ratio of $ClO^-$ increases with increasing pH.

In a dissolution process of the dissolution bath 200, pH of the oxidative alkaline solution is determined according to the pH value of the alkaline solution supplied from the cathode chamber, and the pH value of the alkaline solution increases with increasing time of electric current application.

The alkali metal hydroxide, preferably, sodium hydroxide, is supplied to the dissolution bath in the form of a sodium hydroxide solution and used as a raw material of the oxidative alkaline solution. The alkali metal hydroxide reacts with chlorine gas supplied to the dissolution bath to convert the chlorine gas into a specific chlorine compound. Then, when valuable metals are volatile, chlorine may be recovered as a residual liquid remaining in the dissolution bath after volatilization, and when the valuable metals are non-volatile, chlorine may be recovered as a residual liquid except for hydroxide ions consumed in leaching reaction after separation and purification.

According to the present invention, as shown in FIG. 1, the gas supplier 500 supplies a carrier gas to the dissolution bath 200 through a carrier gas supply line and a nozzle. Here, the nozzle is disposed at an upper end of the dissolution bath 200 so as not to contact the solution within the dissolution bath. In addition, a carrier gas containing a volatile metal oxide is supplied to the collection bath 300 through a nozzle, which is provided to the collection bath 300 and has one end immersed in a collected solution.

Particularly, the apparatus for recovery of valuable metals according to the invention is provided with the chlorine and sodium hydroxide recirculation lines 601, 602, which connects the electrolytic chlorine producing bath 100, the dissolution bath 200 and the separation bath 400 to each other so as to eliminate the need for supply of chlorine and sodium hydroxide from outside, thereby ensuring excellent eco-friendliness by prevention of equipment corrosion and toxic gas leakage, enabling continuous operation of the process while realizing very economical recovery of volatile or non-volatile valuable metals according to the kinds of valuable metals at maximized recovery rate and recovery efficiency.

Advantageous effects of the apparatus and method for recovery of valuable metals according to the present invention will be confirmed through the following examples.

EXAMPLE 1

In the electrolytic chlorine producing bath, 280 mL of 1 mol/L hydrochloric acid solution was supplied to the anode chamber and 280 mL of 2 mol/L NaCl solution was supplied to the cathode chamber. An electric current of 2 A was applied to a graphite electrode of each of the anode and cathode chambers via an electric wire connected to each chamber to cause electrochemical reaction. Here, pH of the solution in the cathode chamber increased with increasing amount of sodium hydroxide over time, and reached 13.376 after 450 minutes from an application time point of electric current. In the solution, sodium hydroxide has a concentration of 0.24 mol/L.

EXAMPLE 2

In the electrolytic chlorine producing bath, 270 mL of 1 mol/L hydrochloric acid solution was supplied to the anode chamber and 600 mL of 2 mol/L NaCl solution was supplied to the cathode chamber. An electric current of 2 A was applied to a graphite electrode of each of the anode and cathode chambers via an electric wire connected to each chamber to produce chlorine gas. Here, pH of the solution in the cathode chamber increased with increasing amount of sodium hydroxide over time. At this time, unused chlorine gas was supplied from the dissolution bath to the cathode chamber to test a recirculation rate in order to confirm chlorine recirculation capability. As the amount of the unused chlorine supplied to the cathode chamber increased, an electric current theoretically corresponding to an amount of chlorine gas produced in the anode chamber was applied. When 0.0326 mol/h or less of chlorine was supplied to the cathode chamber, the recirculation rate was 100%, and when 0.0373 mol/h of chlorine was supplied to the cathode chamber, the recirculation rate was 99.7%. A recirculation rate of 99.7% means that 0.3% of the unused chlorine gas supplied to the cathode chamber was discharged outside the system instead of being reduced.

EXAMPLE 3

In the electrolytic chlorine producing bath, 250 mL of 1 mol/L hydrochloric acid solution was supplied to the anode chamber and 600 mL of 2 mol/L NaCl solution was supplied to the cathode chamber. An electric current of 2 A was applied to a graphite electrode of each of the anode and cathode chambers via an electric wire connected to each chamber to produce chlorine gas. The produced chlorine gas was reacted with 200 ml of pH 13.5 aqueous NaOH solution in the leaching bath to produce an oxidative alkaline solution containing 0.9 mol/L $OCl^-$. The final pH value of the solution was adjusted to 13. Then, 1 g of ruthenium powder was provided to the solution to be dissolved therein while stirring the prepared solution at 400 rpm at 40° C. By dissolution for 30 minutes, 100% of the ruthenium powder was dissolved in the solution. Then, volatilization was performed under conditions wherein the dissolution bath was maintained at 80° C., an air carrier gas was injected at a rate of 400 ml/min, and an electric current of 2 A was applied to supply chlorine gas for reducing pH. As a result, 99.95% of ruthenium was volatilzed after 180 minutes. In the collection bath, 250 ml of a mixture solution containing 20 vol % of ethanol in 6 mol/L hydrochloric acid solution was used as a collection solution, and the mixture solution was maintained at a temperature of 10° C. 180 minutes into collection operation, the collection rate reached 96.2%, and 3.8% of ruthenium was lost in the form of ruthenium dioxide or in the form of leakage at connected portions during volatilization.

EXAMPLE 4

In the electrolytic chlorine producing bath, 250 mL of 1 mol/L hydrochloric acid solution was supplied to the anode chamber and 600 mL of 2 mol/L NaCl solution was supplied to the cathode chamber. An electric current of 2 A was applied to a graphite electrode of each of the anode and cathode chambers via an electric wire connected to each chamber to produce chlorine gas, which in turn was supplied to the oxidative alkaline solution storage bath containing a sodium hydroxide solution supplied from the cathode chamber. As a result, 600 mL of pH 12 oxidative alkaline solution containing 0.7 mol/L $OCl^-$ was produced in the oxidative alkaline solution storage bath. Then, 400 mL of the oxidative alkaline solution was supplied to the dissolution bath, in which the oxidative alkaline solution was maintained at 60° C. 2 g of a mixture containing 50% of tungsten and 50% of ruthenium was supplied to the dissolution bath and stirred at 400 rpm for leaching operation. 60 minutes into leaching operation, the mixture was completely dissolved in the oxidative alkaline solution, and chlorine gas was additionally added to lower pH of the solution to pH 2. Then, volatilization was performed under conditions wherein the dissolution bath was maintained at 80° C. and an air carrier gas was injected at a rate of 400 ml/min. As a result, 99.9% of ruthenium was volatilzed after 180 minutes. In the collection bath, 250 ml of a mixture solution containing 20 vol % of ethanol in 6 mol/L hydrochloric acid solution was used as a collection solution, and the mixture solution was maintained at a temperature of 10° C. 180 minutes into collection operation, the collection rate reached 96%. During volatilization of ruthenium, tungsten was precipitated as tungsten oxide due to pH reduction. After volatilization of ruthenium, the remaining tungsten oxide-containing solution was carried to the separation bath and subjected to solid/liquid separation to recover 99.9% of tungsten in the form of tungsten oxide. The residual liquid was supplied to the cathode chamber of the electrolytic chlorine producing bath to be reused for preparation of sodium hydroxide.

Although some embodiments have been described herein, it should be understood that the present invention is not limited to these embodiments and may be embodied in different ways, and that these embodiments are given to provide thorough understanding of the invention to those skilled in the art, and that various modifications, variations, and alterations can be made without departing from the spirit and scope of the invention. Therefore, the scope of the invention is limited only by the accompanying claims and equivalents thereof.

What is claimed is:

1. An apparatus for recovery of metals, the apparatus comprising:
    an electrolytic chlorine producing bath;
    a dissolution bath operatively coupled to the electrolytic chlorine producing bath, and configured to perform leaching of a metal content;
    a gas supplier connected to the dissolution bath, and configured to supply a carrier gas;
    a collection bath operatively coupled to the dissolution bath, and configured to collect a volatile material;
    a separation bath configured to separate and purify a leached metal content;
    a first chlorine and sodium hydroxide recirculation line connecting the electrolytic chlorine producing bath and the dissolution bath;
    a second chlorine and sodium hydroxide recirculation line connecting the electrolytic chlorine producing bath and the separation bath;
    an oxidative alkaline solution storage bath disposed with the dissolution bath and the collection bath, the oxidative alkaline solution storage bath being connected to the electrolytic chlorine producing bath; and
    a three-way valve fluidically connecting the electrolytic chlorine producing bath, the dissolution bath, and the oxidative alkaline solution storage bath, and configured to control transport of chlorine gas between the electrolytic chlorine producing bath, the dissolution bath, and the oxidative alkaline solution storage bath.

2. The apparatus of claim 1,
    wherein the electrolytic chlorine producing bath comprises:
    an electrolyte containing at least one of a chloride ion-containing acid or an alkali metal chloride,
    an anode chamber,
    a cathode chamber, and
    an ion exchange membrane dividing the anode chamber and the cathode chamber from each other, and
    wherein at least one of chlorine gas generated in the anode chamber or a sodium hydroxide solution generated in the cathode chamber is supplied to the dissolution bath.

3. The apparatus of claim 1, wherein the first chlorine and sodium hydroxide recirculation line is configured to allow the chlorine gas remaining in the dissolution bath after the leaching to be resupplied to the electrolytic chlorine producing bath.

4. The apparatus of claim 1, wherein the first chlorine and sodium hydroxide recirculation line is configured to allow a sodium hydroxide solution produced in the electrolytic chlorine producing bath and supplied to the dissolution bath to be resupplied to the electrolytic chlorine producing bath through the separation bath.

5. The apparatus of claim 1, wherein the oxidative alkaline solution storage bath is configured to store an oxidative alkaline solution of pH 8 or more, produced by allowing an alkaline solution stored therein to react with the chlorine gas supplied from the electrolytic chlorine producing bath.

6. The apparatus of claim 1, wherein the gas supplier is configured to supply a carrier gas to the dissolution bath through a carrier gas supply line and a first nozzle provided to the dissolution bath, wherein the first nozzle at the dissolution bath is disposed so as not to contact a solution of the dissolution bath, and wherein a second nozzle at the collection bath is connected to the dissolution bath and is immersed into a collection solution of the collection bath.

7. The apparatus of claim 2, wherein hydrogen produced in the cathode chamber of the electrolytic chlorine producing bath is a heat source.

8. The apparatus of claim 1, wherein the apparatus is a system capable of blocking light from outside of the apparatus.

9. A method for recovery of valuable metals using the apparatus recited in claim 1 for recovery of valuable metals, comprising:

a) providing the apparatus of claim 1;

b) transferring chlorine gas and a sodium hydroxide solution from an electrolytic chlorine producing bath to a dissolution bath, the chlorine gas and sodium hydroxide solution being produced by applying electric current or voltage to the electrolytic chlorine producing bath;

c) subjecting a valuable metal content to leaching with an oxidative alkaline solution generated by reaction of the transferred chlorine gas and the sodium hydroxide solution to produce a leaching solution;

d) volatizing leached valuable metals from the leaching solution to be collected in a collection bath and transferring the leaching solution to a separation bath for separation and purification of a valuable metal from the leaching solution; and e) recirculating unused chlorine gas and a chloride ion-containing solution generated during separation of the valuable metal to the electrolytic chlorine producing bath.

10. The method of claim 9, wherein the dissolution bath is provided at a side thereof with a gas supplier to supply a carrier gas through a nozzle of the dissolution bath.

11. The method of claim 9, wherein the valuable metal content is subjected to leaching in the oxidative alkaline solution at pH 8 or more and a temperature of 20 to 90° C.

12. The method of claim 9, wherein the valuable metal is volatilized from the leaching solution controlled to have a pH of 1 to 10 at a temperature of 20 to 90° C.

13. The method of claim 9, wherein collection of the valuable metal in the collection bath is performed at a temperature of 5-30° C. in a solution containing a reducing agent.

14. The method of claim 9, wherein the recirculating the chlorine gas comprises resupply of the chlorine gas remaining in the dissolution bath to the cathode chamber of the electrolytic chlorine producing bath to reduce the chlorine gas into chloride ions in order to reuse the remaining chlorine gas, or resupply of the chloride ion-containing solution, remaining after separation of the valuable metal from the leaching solution in the separation bath, to the cathode chamber of the electrolytic chlorine producing bath to serve as a raw material of the alkaline solution.

* * * * *